United States Patent [19]

Guimbal

[11] Patent Number: 5,251,847
[45] Date of Patent: Oct. 12, 1993

[54] TAIL ROTOR ANTI-TORQUE SYSTEM FOR A HELICOPTER

[75] Inventor: Bruno Guimbal, les Milles, France

[73] Assignee: Aerospatiale Societe Nationale Industrielle, Paris, France

[21] Appl. No.: 969,714

[22] Filed: Oct. 28, 1992

[30] Foreign Application Priority Data

Nov. 7, 1991 [FR] France ............................ 91 13742

[51] Int. Cl.⁵ ............................................ B64C 27/82
[52] U.S. Cl. ............................ 244/17.19; 244/17.21
[58] Field of Search ............... 244/17.19, 17.15, 17.21, 244/17.11; 446/36, 31; 440/67

[56] References Cited

U.S. PATENT DOCUMENTS

| | | | |
|---|---|---|---|
| 2,531,976 | 11/1950 | Garrett | 244/17.19 |
| 3,583,659 | 6/1971 | Lermusiaux | 244/17.19 |
| 4,506,849 | 3/1985 | Lemont | 244/17.21 |

FOREIGN PATENT DOCUMENTS 1511006 1/1968 France .
2338845 8/1977 France .

*Primary Examiner*—Michael S. Huppert
*Assistant Examiner*—Anne E. Bidwell
*Attorney, Agent, or Firm*—Fisher, Christen & Sabol

[57] ABSTRACT

An anti-torque system for a helicopter with a rearwards-elongated fuselage where an engine drives a main gearbox. The engine and the main gearbox are arranged in the central part of the fuselage. The anti-torque system includes an anti-torque tail rotor whose axis is transversal with respect to the fuselage and which is situated at the rear end of the fuselage. A fairing defines an aerodynamic tunnel in which the tail rotor is housed coaxially. The tunnel has a trailing edge on the downstream side of the airflow blown by the tail rotor. A tail gearbox is arranged in the tunnel and is able to rotationally drive the tail rotor. A rotating transmission shaft connects the main gearbox to the tail gearbox. The transmission shaft passes in the vicinity of the trailing edge of the tunnel.

5 Claims, 3 Drawing Sheets

TAIL ROTOR ANTI-TORQUE SYSTEM FOR A HELICOPTER

The present invention relates to a rear rotor anti-torque system for a helicopter.

It is known that such anti-torque systems comprise a tail rotor arranged at the end of the tail of the helicopter and intended to produce a torque opposing the torque induced on the fuselage by the rotational drive of the main rotor. The rotational drive of this tail rotor is produced by a tail gearbox arranged coaxially to said tail rotor and rotationally driven by a transmission shaft arranged in the median longitudinal plane of the tail fuselage and connected to the main gearbox. This transmission shaft is sited outside or inside the tail, and may be guided by bearings distributed along the latter, or connected to the latter by one or more devices limiting its vibrations. When, in a known way, said tail rotor is advantageously surrounded by a fairing making it possible to improve its performance and safety, said fairing is pierced by a central longitudinal passage which said transmission shaft passes through in order to reach the tail gearbox. In certain known embodiments, on passing through the aerodynamic tunnel constituted by the internal volume of said fairing, the shaft passes inside a profiled shell which may form one of the arms of the framework supporting the gearbox inside the fairing.

Such an arrangement is, for example, shown in the Patent FR-A-1,511,006. The presence of this central longitudinal passage dictates, in order to be able to mount the transmission shaft, that the latter is in at least two parts, so as to slide the rear part into this longitudinal passage, then to couple it, in the area of the bearing which is closest to the rear rotor, to the rest of the transmission shaft, by means of a coupling which can be undone, which mechanically complicates the assembly and increases its weight and cost.

The transmission shaft or the profiled shell which surrounds it have to be arranged at a certain distance from the blades of the tail rotor in order to avoid a siren effect due to the aerodynamic interactions set up by the passage of said blades in immediate proximity to one or the other. However, where a lightweight helicopter is concerned, the fairing is of reduced thickness transversely in such a way that it is not possible to keep sufficient distance and significant noise generation by its anti-torque system results therefrom.

Moreover, said passage for the transmission shaft through the fairing is situated at the critical site where the forces on the tail and on the anti-torque rotor are taken by the tail boom of the helicopter. It therefore dictates installing structural reinforcements in this area. Moreover, in this known system, the transmission shaft is substantially in the axis of the tail of the helicopter, which is not optimal. In fact, this location is the best for housing a radial support arm for the tail gearbox.

The object of the present invention is to remedy these drawbacks.

To this end, according to the invention, the anti-torque system for a helicopter with a rearwards-elongated fuselage comprising an engine driving a main gearbox, said engine and said main gearbox being arranged in the central part of said fuselage, and said anti-torque system comprising:

an anti-torque tail rotor whose axis is transversal with respect to said fuselage and which is situated at the rear end of said fuselage;

a fairing defining an aerodynamic tunnel in which said tail rotor is housed coaxially, said tunnel comprising a trailing edge on the downstream side of the airflow blown by said tail rotor in its main operating mode;

a tail gearbox arranged in said tunnel and able to rotationally drive said tail rotor; and a rotating transmission shaft connecting the main gearbox to the tail gearbox;

is noteworthy in that the said transmission shaft passes in the vicinity of said trailing edge of the aerodynamic tunnel.

Hence, the transmission shaft is easily installable, since it does not have to pass through the fairing, which eliminates the constraints set out above, and it is possible to adapt the size of the fairing to obtain a sufficient distance between this transmission shaft and the rotational plane of the blades of the tail rotor, in order, on the one hand, to attenuate the noise generated and, on the other hand, to reduce the size of the tail gearbox.

It will be noted that, for said transmission shaft to pass in the vicinity of said trailing edge of the aerodynamic tunnel, it is possible to envisage:

either to offset, transversely to the median longitudinal plane of the rear part of the fuselage of the helicopter, the outlet from the main gearbox, said transmission shaft remaining parallel to said plane;

or to keep said transmission shaft in the median longitudinal plane of the rear part of the fuselage of the helicopter, the end of this rear part bearing said anti-torque rotor being arranged obliquely with respect to this plane;

or even, to arrange said transmission shaft obliquely with respect to the median longitudinal plane of the rear part of the fuselage of the helicopter.

It is this latter solution which will be described in more detail in what follows.

Moreover, by virtue of the invention, the transmission shaft may be in a single piece, which reduces its mechanical complexity, its mass and its cost.

Preferably, the transmission shaft passes through an indentation formed in said trailing edge of the tunnel and open towards the outside. Thus, it is possible to give the tunnel sufficient length to obtain good aerodynamic efficiency without making the transmission shaft too oblique.

Advantageously, between said main and tail gearboxes, the transmission shaft is housed in a trough formed in the tail and possibly in the rear part of said fuselage.

The position of this transmission shaft may be optimized by installing it, in the area of the tail rotor, in the wake, with respect to the air blown by said tail rotor, of an arm for fixing the tail gearbox to the structure of the tunnel, which masks this transmission shaft and thus avoids disturbing the flow of air blown by the tail rotor.

The figures of the attached drawing will give a good understanding of how the invention can be embodied. In these figures, identical references designate similar elements.

Figure 1:
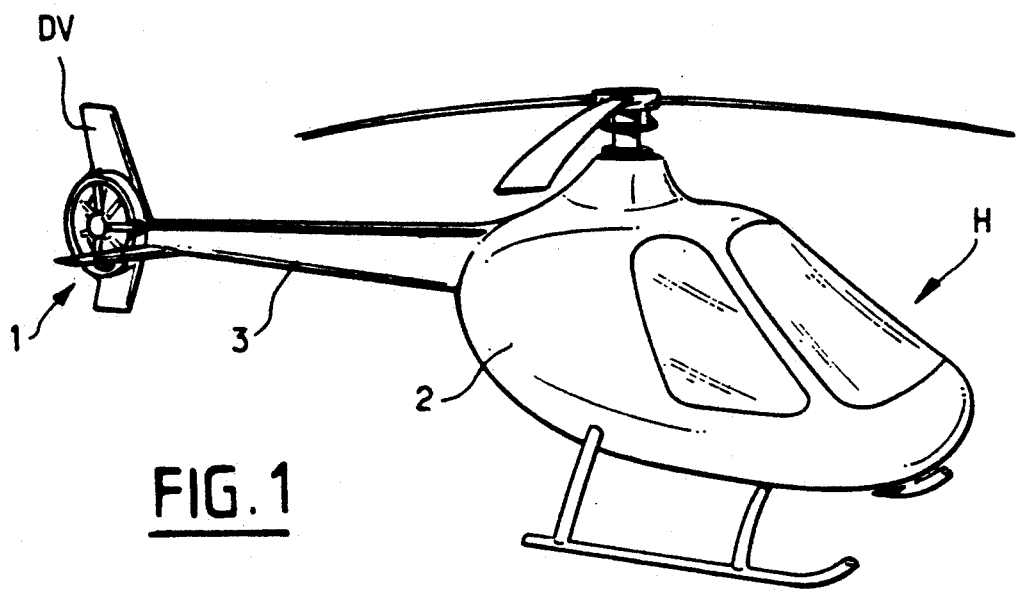
FIG. 1 is a perspective view of a light helicopter provided with an anti-torque system in accordance with the present invention.
Figure 2:
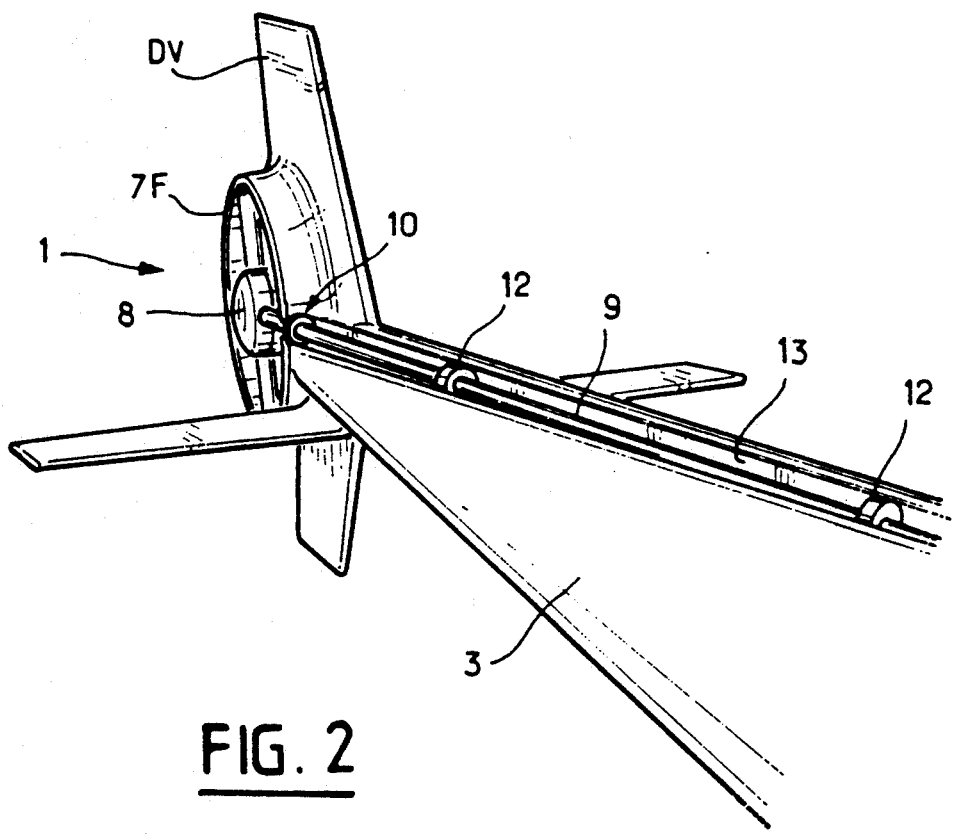
FIG. 2 is a perspective view of the rear part of the helicopter of FIG. 1, from the tail gearbox side.
Figure 3:
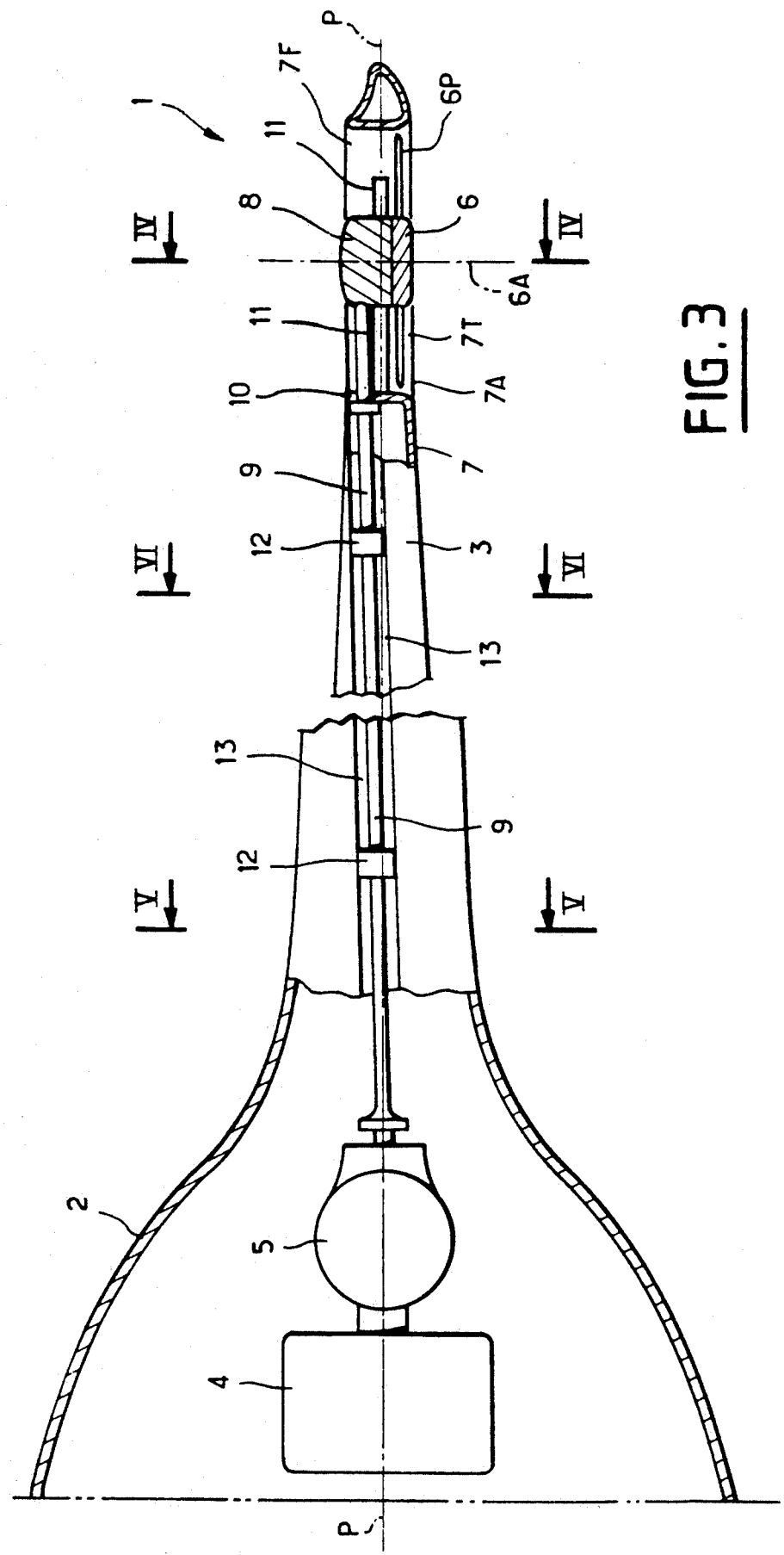
FIG. 3 is a partial, sectional plan view of the helicopter of FIG. 1.

The light helicopter H, in accordance with the present invention and shown by FIG. 1, comprises a rear anti-torque system 1. Its fuselage comprises a central part 2 extended rearwards by a tail 3. In the central part 2 an engine 4 is installed driving a main gearbox 5. The anti-torque system 1, arranged at the end of the tail 3 opposite the front part 2, comprises a anti-torque tail rotor 6, whose axis 6A is transversal with respect to the fuselage 2, 3 and which is provided with blades 6P. A fairing 7 defines an aerodynamic tunnel in the shape of a cylindrical tunnel 7T in which said tail rotor 6 is housed coaxially, the latter being installed in proximity to the leading edge 7A of this tunnel 7T and blowing air towards the trailing edge 7F of said tunnel 7T.

The fairing 7 is arranged at the base of the vertical fin DV of the helicopter H.

A tail gearbox 8 is coupled to this tail rotor 6 so as to drive it in rotation. A rotating transmission shaft 9 connects the main gearbox 5 to the tail gearbox 8, which provides the rotational drive for the rear rotor 6.

An indentation 10 is made into the trailing edge 7F of the fairing 7, thus on the side of this fairing 7 opposite the rotational plane of the blades 6P of the tail rotor 6, for the passage of the transmission shaft 9, and comprises a lateral aperture of sufficient size to permit direct installation of this transmission shaft 9, and providing for a certain distance to be kept between the tail rotor 6 and the transmission shaft 9. Fixing arms 11, for example three in number, provide for fixing the tail gearbox 8 supporting the tail rotor 6 with respect to the structure of the tunnel 7T. The transmission shaft 9, in a single piece, is oblique with respect to the median longitudinal plane P of the tail 3 and passes outside the tail 3, while being guided by bearings 12 distributed from place to place along this tail 3.

Figure 4:
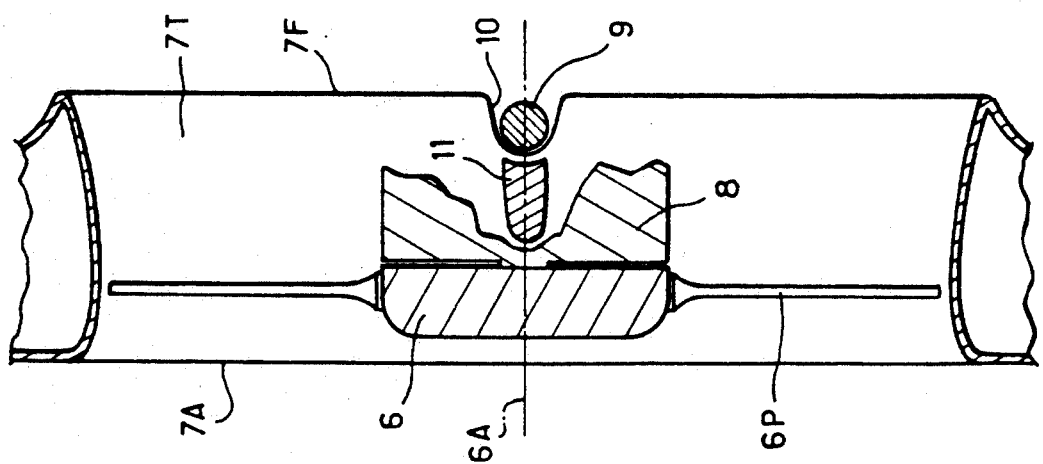
FIG. 4 shows in enlarged vertical cross section along the line IV—IV of FIG. 3, the faired anti-torque tail rotor.

In order to limit the aerodynamic perturbations due to the indentation 10 and to the transmission shaft 9, as FIG. 4 shows, one of the fixing arms 11, supporting the tail rotor 6 and the tail gearbox 8, is advantageously arranged in the same axial plane, with respect to the axis 6A of the tail rotor 6, as the transmission shaft 9 and the indentation 10, in such a way that said transmission shaft is in the wake of the air blown by the tail rotor 6.

Figure 5:
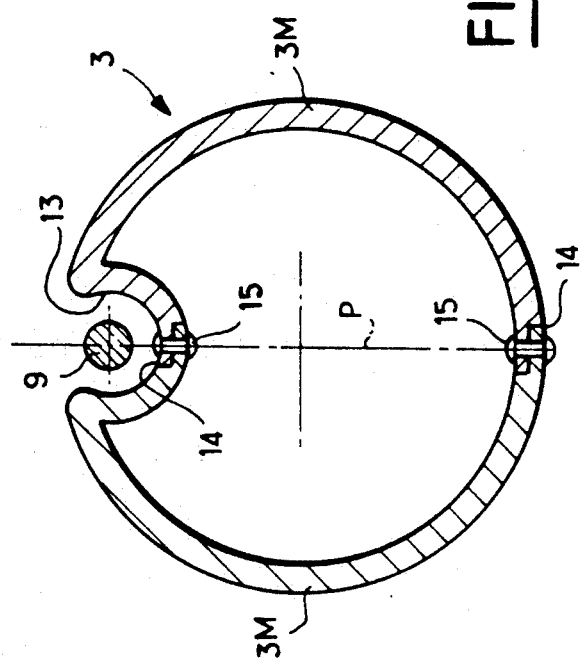
FIGS. 5 and 6 are enlarged cross sections respectively along the lines V—V and VI—VI of FIG. 3.
Figure 6:
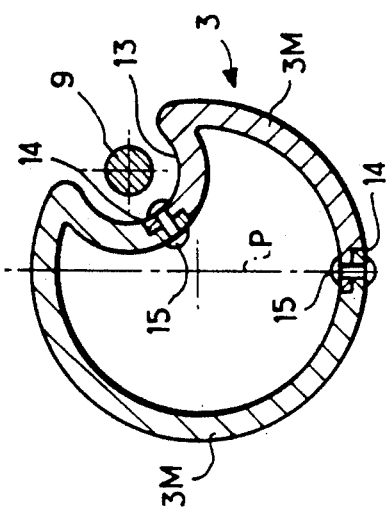

The transmission shaft 9 is housed in a trough 13, which is oblique with respect to the median longitudinal plane P of the tail, as FIGS. 5 and 6 clearly show. The trough 13 is open towards the outside and is produced in the shell structure of the tail 3. It contributes to increasing the rigidity of the latter. This is particularly advantageous when this tail 3 is constituted by molded parts 3M made of composite material and assembled, to which it is easy to give the shape required to form the trough 13. If the assembling lines 14 of these molded parts 3M are arranged longitudinally to the tail 3, the shape of these molded parts 3M may be adapted to accommodate or comprise such a trough 13, forming a sort of groove on the surface of the tail 3. In particular, an assembling line 14 for these parts 3M molded in two half-shells may be situated in the area of this groove, which makes it possible to hide the assembling means 15 of these molded parts 3M. As the difference in relative position between these FIGS. 5 and 6 shows, between the transmission shaft 9 and the median plane P, the direction of this trough 13 is oblique with respect to the longitudinal direction of this tail 3, substantially circular in this example, in order to end up near to the trailing edge 7F of the fairing 7. FIG. 5 shows that the connection of the transmission shaft 9 onto the main gearbox 5 is situated in the vicinity of the median plane P.

Thus it can be seen that, by virtue of the invention, the oblique arrangement of the shaft 9 in a single piece avoids piercing an axial passage in the fairing 7 and thus weakening the latter, which serves as a base for the vertical fin DV. Consequently, optimal transmission of the forces between said fin DV and the tail boom 3 is obtained.

I claim:

1. An anti-torque system (1) for a helicopter with a rearwards-elongated fuselage (2, 3) comprising an engine (4) driving a main gearbox (5), said engine (4) and said main gearbox (5) being arranged in the central part (2) of said fuselage, and said anti-torque system (1) comprising:
   an anti-torque tail rotor (6) whose axis (6A) is transversal with respect to said fuselage (2, 3) and which is situated at the rear end of said fuselage (2, 3);
   a fairing (7) defining an aerodynamic tunnel (7T) in which said tail rotor (6) is housed coaxially, said tunnel (7T) comprising a trailing edge (7F) on the downstream side of the airflow blown by said tail rotor (6) in its main operating mode;
   a tail gearbox (8) arranged in said tunnel (7T) and able to rotationally drive said tail rotor (6); and
   a rotating transmission shaft (9) connecting the main gearbox (5) to the tail gearbox (8); wherein the said transmission shaft (9) passes through an indentation (10) formed in said trailing edge (7F) of the tunnel (7T) and open towards the outside, without passing through said fairing (7).

2. The anti-torque system (1) as claimed in claim 1 wherein the transmission shaft (9) is arranged obliquely with respect to the medium longitudinal plane of the rear part of the fuselage of the helicopter.

3. The anti-torque system (1) as claimed in claim 1 wherein the transmission shaft (9) is in a single piece.

4. The anti-torque system (1) as claimed in claim 1 wherein the transmission shaft (9) is housed in a trough (13) formed in the rear part (3) of said fuselage (2, 3).

5. The anti-torque system (1) as claimed in claim 1 in which said tail gearbox (8) is fixed in said tunnel by virtue of radial fixing arms (11) connecting it to the periphery of said tunnel, wherein the transmission shaft (9) is situated, in the area of the tail rotor (6), in the wake, with respect to the airflow blown by said tail rotor (6), of an arm (11) for fixing the tail gearbox (8) to the structure of the tunnel (7T).

* * * * *